United States Patent Office 2,790,150
Patented Apr. 23, 1957

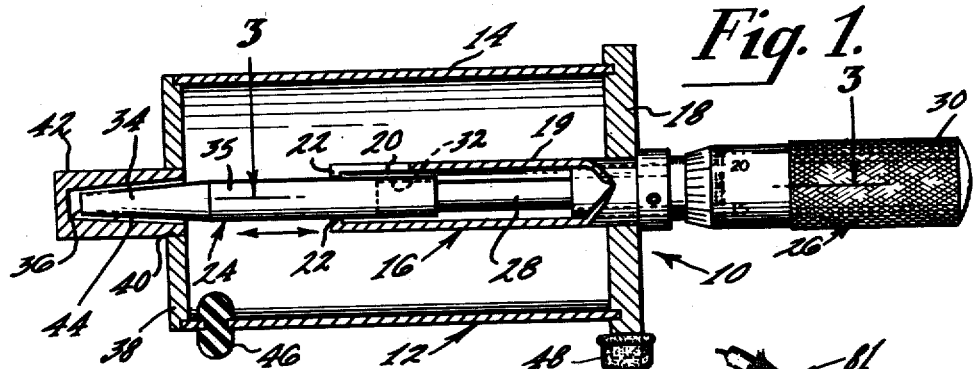
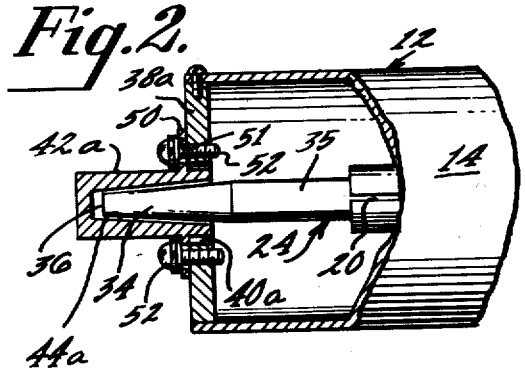
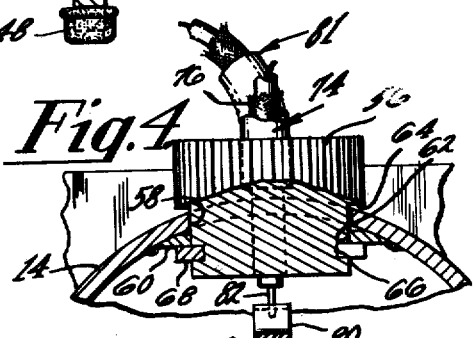
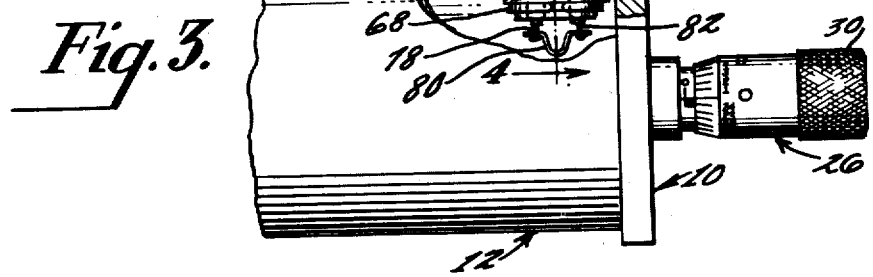
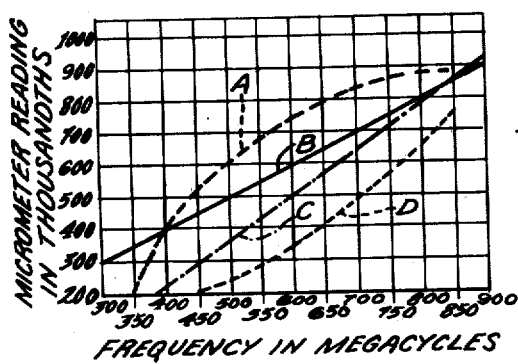

2,790,150

WAVEMETER

Horace F. Hanthorn, Woodbury, N. J., assignor to Radio Corporation of America, a corporation of Delaware Application January 31, 1955, Serial No. 484,886

2 Claims. (Cl. 333—82)

This invention relates generally to wavemeters, and more particularly to a wavemeter of the ultrahigh frequency type adapted to measure frequencies in the range between 300 and 900 megacycles with high accuracy. While neither specifically nor exclusively limited thereto, the wavemeter of the present invention is particularly useful as a frequency calibrating marker unit for marking frequency response oscillographs when used in conjunction with an ultrahigh frequency sweep generator and associated equipment.

It has been proposed to measure wavelengths, or frequencies, by means of a wavemeter of the coaxial line type. Where the wavemeter has been end loaded by a variable capacitor employing an inner conductor, or rod, as one of the plates of the capacitor, it has been extremely difficult to obtain a linear relationship between the frequency of the wavemeter and the tracking of the capacitor. In most of the prior art wavemeters, calibration curves had to be resorted to for indicating the relationship of the frequency of the wavemeter to a particular capacitor setting. Also, the electromagnetic energy input coupling to most wavemeters, and the output means therefrom, have been fixed so that external attenuators have to be used to vary the energy input and output from the wavemeter. According to the present invention, there is provided an improved wavemeter of relatively simple design and operation, wherein the tracking of a variable capacitor bears a linear relationship to the resonant frequency of a coaxial line; and wherein the energy coupling to and from the wavemeter is variable over a wide range, from a minimum to a maximum, by a novel coupling means.

Accordingly, it is a principal object of the present invention to provide an improved wavemeter of the coaxial line type that will overcome the aforementioned disadvantages.

Another object of the present invention is to provide an improved wavemeter of the coaxial line type that is end loaded by an adjustable capacitor whose tracking bears a linear relationship with the resonant frequency of the wavemeter.

A further object of the present invention is to provide an improved wavemeter having novel adjustable coupling means for applying energy to and deriving energy from the wavemeter, thereby eliminating the need for external attenuating means.

Still a further object of the present invention is to provide an improved wavemeter of the quarter-wave-length coaxial line end loaded type that is simple in construction and operation, easy to manufacture and yet highly efficient in use.

These and, perhaps, further objects of the present invention are attained in an improved wavemeter of the coaxial line quarter-wavelength type. The coaxial line is short-circuited at one end, and is end loaded at the other end by a variable capacitor formed between the inner conductor of the coaxial line and the inner surface of an end plate of the coaxial line. The capacity of the adjustable capacitor is varied by a standard micrometer head, positioned outside of the coaxial line, for reciprocating the inner conductor with respect to the inner surface of the end plate. The inner conductor, or rod, of the coaxial line is formed with a uniform taper at one end for cooperating with the inner surface of a portion of the end plate that is tapered with a complementary taper for the purpose of obtaining a linear relationship between the capacitor tracking and the frequency of the wavemeter. A U-shaped pickup loop is inserted into the short-circuited end of the coaxial line for the purpose of making input and output connections thereto. The pickup loop is fixed to a plug rotatable in the outer conductor of the coaxial line for the purpose of varying the electromagnetic energy input to, and output from, the coaxial line.

The novel features of the present invention, as well as the invention itself, both as to its organization and method of operation, will be understood in detail from the following description, when considered in connection with the accompanying drawing, in which similar reference characters represent similar elements, and in which:

Fig. 1 is a side elevational view, partly in cross-section and with parts broken away, of a wavemeter in accordance with the present invention;

Fig. 2 is a fragmentary side elevational view, partly in cross-section and with parts broken away, of the capacitor end loading of a wavemeter of modified design, in accordance with the present invention;

Fig. 3 is a fragmentary cross-sectional view of a portion of the wavemeter of Fig. 1, taken along the line 3—3 of Fig. 1, showing the adjustable energy input and output means of the wavemeter;

Fig. 4 is a cross-sectional view of the input and output energy means taken along the line 4—4 of Fig. 3; and Fig. 5 is a graph used to explain the operation of the wavemeter in accordance with the present invention.

Referring now to Fig. 1, there is shown a wavemeter 10, in accordance with the present invention. The wavemeter 10 comprises a coaxial line 12 that is a quarter of a wavelength long at the highest operating frequency of the wavemeter 10. The coaxial line 12 has an outer conductor or cylindrical housing 14 short-circuited to inner conductor means 16 by means of an end-plate 18.

The inner conductor means 16 comprises a tubular member 19 having one end fixed to the end-plate 18 and coaxially aligned with the outer cylindrical housing 14. The other end of the tubular member 18 is formed with a plurality of longitudinally disposed grooves 20, for the purpose hereinafter appearing. The grooved end of the tubular member 19 is also formed with inwardly disposed teeth 22, for the purpose hereinafter appearing. The inner conductor means 16 also comprises a rod 24 coaxially disposed with respect to the cylindrical housing 14 and the tubular member 19, and slideable between the teeth 22 thereof.

A standard micrometer head 26 is fixed within the tubular member 19 in a manner whereby a rod 28 thereof can be reciprocated by rotating the knurled portion 30 of the micrometer head 26. The distal end of the rod 28 is telescoped within a recess 32 in an end of the rod 24, and in axial alignment therewith. The rod 28 is fixed to the rod 24 in any suitable manner, as by a pressed fit, so that the rod 28 may be reciprocated back and forth by rotating the knurled portion 30 of the micrometer head 36, in a manner well known in the art. The free end of the rod 24 is uniformly tapered to form a frustum 34 of a right circular cone. Thus, the rod 24 may be considered as comprising a cylindrical section 35 adjacent a conical section comprising the frustum 34 of a right circular cone.

The outer conductor or cylindrical housing 14 is closed at the loaded end thereof by a metallic disc 38. The disc 38 is formed with a central hole 40 into which is fixed a tubular member 42, in any suitable manner. The tubular member 42 is closed at its outer end and open at its inner end to receive the uniformly tapered portion 34 of the rod 24. The inner surface 44 of the tubular member 42 has a complementary taper to that of the frustum portion 34 of the rod 24. It will now be understood that the frustum portion 34 of the rod 24 and the inner surface 44 of the tubular member 42 comprise a variable capacitor that is the end loading of the coaxial line 12.

A rubber foot 46 is inserted at the bottom of the cylindrical housing 14, and a rubber foot 48 is fitted to the lower portion of the end plate 18 for the purpose of resiliently supporting the wavemeter 10 on a flat surface.

It will now be understood that the wavemeter 10 comprises a resonant circuit wherein the inductance is defined by the coaxial line including the outer conductor 14 and the inner conductor means 16 shorted at one end by the end plate 18; and wherein the capacitor comprises a tapered or frustum portion 34 of the rod 24 and the complementary inner surface 44 of the tubular member 42.

It has been found that when the angle of the frustum portion 34 of the rod 24 forms an angle of four degrees fifteen minutes (4° 15′) with the axis of the rod 24, and when the inner surface 44 of the tubular member 42 has a complementary taper, that is, four degrees fifteen minutes (4° 15′) with the axis of the tubular member 42, the frequency of the resonant circuit of the wavemeter 10 will bear a linear relationship to the reading on the standard micrometer head. It is noted that the length of the tapered portion 34 of the rod 24 is substantially equal to the length of travel of the rod 24 provided by the micrometer head 26. Thus, if the micrometer 26 will reciprocate the rod 24 one inch, the length of the frustum portion 34 of the rod 24 will be substantially one inch in length.

The cylindrical portion 35 of the rod 24 is frictionally engaged between the teeth 22 of the tubular member 19 for the purpose of guiding the rod 24 in a coaxial direction therewith. In addition, the teeth 22 provide a low resistance electrical contact path between the rod 24 and the tubular member 19. The grooves 20 in the tubular member 19 permit the teeth 22 to be biased axially in order to provide sufficient pressure on the reciprocating rod 24.

Referring now to Fig. 2, there is shown a modification of the end loading of the wavemeter 10, shown in Fig. 1. In Fig. 2, the outer conductor 14 has its loaded end fitted with a disc 38a having a central hole 40a therein, through which the frustum portion 34 of the rod 24 protrudes. A tubular member 42a, closed in one end and open at the other, is provided with a circular outwardly extending flange 50 in contact with the outer surface of the dics 38a. The flange 50 is provided with a plurality of clearance holes 51, each having a diameter greater than the diameter of screws 52 extending therethrough, respectively. The screws 52 are engaged in threaded holes in the disc 38a. The inner surface 44a of the tubular member 42a is tapered with a taper complementary to the frustum portion 34 of the rod 24, and is similar to the tapered surface 44 of the tubular member 42 in Fig. 1. With the end loaded construction shown in Fig. 2, means are provided for aligning the tubular member 42a coaxially with the frustum portion 34 of the rod 24. The clearance holes 51 permit the tubular member 42a to be positioned in coaxial alignment with the rod 24 when the screws 52 are loosened. When the tubular member 42a is properly aligned, the screws 52 are tightened.

In accordance with the present invention, adjustable means are provided for applying electromagnetic energy to the wavemeter 10. To this end, there is provided a metallic plug 56, as shown in Figs. 3 and 4. Means are provided to permit the plug 56 to rotate in a plane tangentially disposed to the outer conductor 14. To this end, the outer condutcor 14 is provided with a hole 58 adjacent the end plate 18. A flat plate 60 is fixed to the inner surface of the outer conductor 14, as by soldering. The plate 60 is formed with a hole 62 therein and aligned with the hole 58 in the outer conductor 14, for the purpose of guiding the cylindrically shaped plug 56 for rotation about its axis. The cylindrically shaped plug 56 is formed with a shoulder 64 that abuts the outer surface of the outer conductor 14. The plug 56 is also formed with a circular groove 66, in its outer wall, disposed below the plate 60 when the plug 56 is resting lightly with its shoulder 64 on the outer surface of the outer conductor 14. A split washer 68 is forced into the groove 66 in a manner whereby it extends beyond the groove 66 and thereby acts as a means for preventing the plug from moving in the direction of its axis. It will now be understood that the cylindrical plug 56 is mounted for rotation, in the outer conductor 14, about its axis, perpendicularly disposed to the axis of the outer conductor 14.

The plug 56 is provided with two through-openings 70 and 72 symmetrically disposed to each other about the axis of the plug 56. A coaxial cable 74 is inserted into the through-opening 70 in a manner wherein the outer conductor 76 of the cable makes physical contact with the plug 56 within the hole 70. The inner conductor 78 of the coaxial cable 74 insulated from the plug 56, and is connected to a U-shaped pick-up loop 80. It will now be understood that a source of electromagnetic energy may be coupled to the wavemeter 10 through the coaxial cable 74.

A coaxial cable 81 is disposed within the throughopening 72 of the plug 56 in a manner similar to the coaxial cable 74; the outer conductor of the cable 81 being physically connected to the metallic plug 56, and the inner conductor 82 being connected to the pick-up loop 80.

The greatest amount of energy from an external source of electromagnetic energy (not shown) may be coupled to the wavemeter 10 when the plug 56 is in the position shown in Figs. 3 and 4; that is, when the U-shaped pick-up loop 80 is disposed in a plane that is parallel to the axis of the outer and inner conductors 14 and 16 of the coaxial line 12. Under these conditions the amount of energy coupled to the tuned circuit of the wavemeter 10 from an external signal or sweep frequency generator is at a maximum, thereby reducing the amount of energy available to an external detector (not shown). A reverse set of conditions can be obtained by rotating the plug 56 90° from the position indicated in Figs. 3 and 4, whereby the energy transferred through the coaxial cable 74 to the wavemeter will be at a minimum and the energy available to an external detector, via cable 81, will be at a maximum. The frequency measuring function of the wavemeter 10 is therefore accomplished by the absorption of energy from the coaxial transmission cable passing through it.

Referring now to Fig. 5, there is shown a graph wherein the abscissa represents frequency in megacycles and the ordinates represent the penetration of the frustum portion 34 of the rod 24 into the hollow member 42. This is represented by the micrometer readings in thousandths of an inch. Graph A indicates the variation in frequency with the micrometer head reading in thousandths of an inch when the portion 34 of the rod 24 and the inner surface 44 of the tubular member 42 are formed with a zero taper. It will be noted that without tapering the free end of the rod 24 and the inner surface 44 of the hollow member 42, the frequency vs. capacitor tracking of the wavemeter is non-linear. The straight line graphs B and C were made with tapers of four degrees fifteen minutes (4° 15′) to the frustum portion 34 of the rod 24 and to the inner surface 44 of the hollow member 42. The graph B differs from the graph C only in slope. This difference was caused by the difference in the diameters of the rod 24 used. The straight line graph B, indicating a direct relationship between the micrometer head settings in thousandths of an inch and the frequency in megacycles was made with a rod 24 having a diameter of 0.365 inch. The curve D, representing a non-linear function between the frequency and micrometer head setting, was made with a taper of about 8° of the frustum portion 34 of the rod 24.

Thus, it is seen that when the capacitor of a quarter-wave end loaded coaxial line is defined by a frustum section of a right cylinder cone and the inner surface of a hollow member axially aligned therewith, each having a taper of 4° 15′ with the axis of the frustum. The frequency in megacycles of the resulting tuned circuit bears a linear relationship to the penetration of the frustum into the hollow member.

What is claimed is:

1. An adjustable tuned resonant circuit comprising a hollow cylindrical member, rod means extending into said member at one end thereof and defining a quarter-wave coaxial line of variable length therewith, capacitance means associated with said rod means at the other end of said cylindrical member defining an end loading capacitance to vary the resonance of said circuit, said member being formed with an opening adjacent said one end thereof, a plug, means mounting said plug for rotation in said opening about an axis perpendicular to the axis of said cylindrical member, said plug being formed with a pair of through-openings substantially parallel to said axis of rotation, a pair of coaxial cables inserted in said pair of through-openings, each of said cables having an outer conductor in contact with said plug and an inner conductor insulated from said plug, and means connecting said inner conductors to each other within said hollow cylindrical member.

2. An adjustable tuned resonant circuit comprising a hollow cylindrical member, rod means extending into said member at one end thereof and defining a quarter-wave coaxial line of variable length therewith, capacitance means associated with said rod means at the other end of said cylindrical member defining an end loading capacitance to vary the resonance of said circuit, said member being formed with an opening adjacent said one end thereof, a plug, means mounting said plug for rotation in said opening about an axis perpendicular to the axis of said cylindrical member, said plug being formed with a pair of through-openings substantially parallel to said axis of rotation, a pair of coaxial cables inserted in said pair of through-openings, each of said cables having an outer conductor in contact with said plug and an inner conductor insulated from said plug, means connecting said inner conductors to each other within said hollow cylindrical member, said capacitance means comprising a tubular member having an inner surface of uniform taper with respect to the axis of said rod means, and said rod means comprising a frustum of a right circular cone of complementary taper to said inner surface.

References Cited in the file of this patent

UNITED STATES PATENTS

| | | |
|---|---|---|
| 2,402,443 | Peterson | June 18, 1946 |
| 2,603,754 | Hansen | July 15, 1952 |
| 2,609,450 | Early | Sept. 2, 1952 |

UNITED STATES PATENT OFFICE

CERTIFICATE OF CORRECTION

Patent No. 2,790,150 April 23, 1957

Horace F. Hanthorn

It is hereby certified that error appears in the printed specification of the above numbered patent requiring correction and that the said Letters Patent should read as corrected below.

Column 3, line 56, for "dics" read --disc--; column 4, line 28, after "cable 74" insert --is--.

Signed and sealed this 17th day of December 1957.

(SEAL)
Attest:
KARL H. AXLINE

Attesting Officer

ROBERT C. WATSON
Commissioner of Patents